V. A. MARSH.
SPRING TIRE.
APPLICATION FILED JULY 6, 1910.

976,667.

Patented Nov. 22, 1910.

WITNESSES:
Edward Thorpe
C. Murdock

INVENTOR
Vernon H. Marsh
BY Munn & Co
ATTORNEYS

UNITED STATES PATENT OFFICE.

VERNON A. MARSH, OF ENDICOTT, WASHINGTON.

SPRING-TIRE.

976,667.  Specification of Letters Patent. Patented Nov. 22, 1910.

Application filed July 6, 1910. Serial No. 570,530.

*To all whom it may concern:*

Be it known that I, VERNON A. MARSH, a citizen of the United States, and a resident of Endicott, in the county of Whitman and State of Washington, have invented a new and Improved Spring-Tire, of which the following is a full, clear, and exact description.

Among the principal objects which the present invention has in view are: To provide a spring cushion for the tires of vehicle wheels, to yield to the inequalities of the road bed while preserving the circular shape of the tire; to provide a cushion of the character mentioned, having a series of communicating separate spring members arranged to yield individually and to transfer a proportion of the compression strain; to provide means for excluding the dust and grit of the road from access to the working members; to provide a wearing shoe constructed from material adapted to grip the road bed; and to provide a construction for a tire of the character described which is simple, efficient and durable.

One embodiment of the present invention is disclosed in the structure illustrated in the accompanying drawings, in which like characters of reference denote corresponding parts in all the views, and in which—

Figure 1:
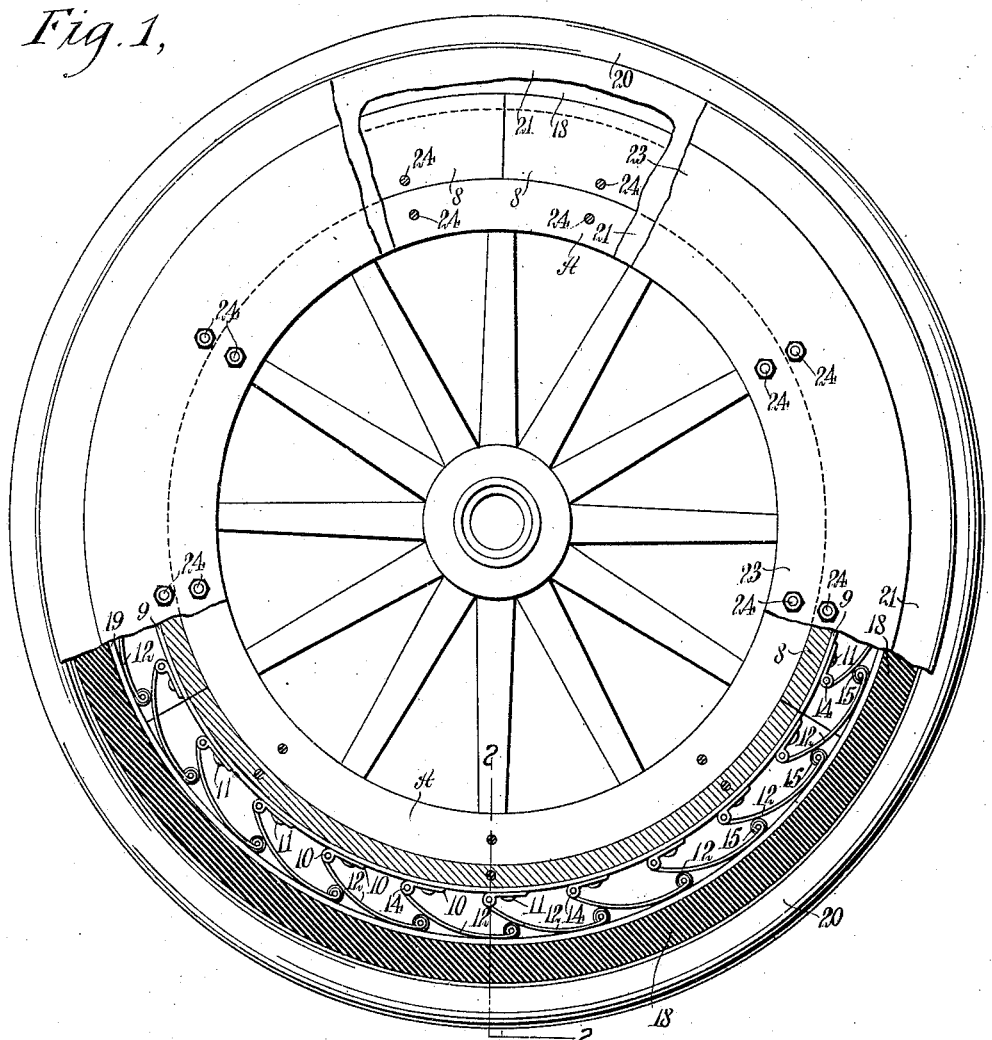
Figure 2:
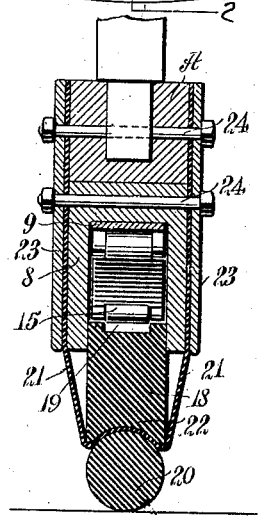
Figure 3:
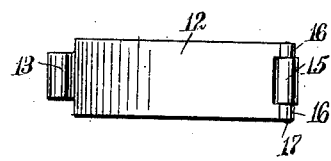

Figure 1 is a side view partly cut away and partly in section, of a vehicle wheel provided with a tire constructed and arranged in accordance with the present invention; Fig. 2 is a cross section of the tire, the section being taken on the line 2—2 in Fig. 1; and Fig. 3 is a detail view, on an enlarged scale, of one of the springs constituting the cushion herein set forth.

The cushion of the tire is formed within a channeled rim 8, between the sides whereof is seated a metal plate ring 9 which is provided with a series of hinge clips 10, 10 secured to the ring 9 by rivets 11, 11. The hinge clips 10, 10 are provided to receive bowed leaf springs 12, 12, the curled end 13 of each spring forming a perforation to receive hinge bolts 14, 14. The springs 12 are bowed substantially as shown in Fig. 1 of the drawings, and are each provided at the free end with a roller 15. The roller 15 is suitably mounted in curled extensions 16, 16 formed on the said springs 12 and held in rotative relation to the springs by a pivot shaft 17.

The springs 12, 12 are disposed on the ring 9 at intervals, so that the roller 15 of each spring rests upon the outer face of the following spring, and in turn is itself supported by the roller end of the preceding spring. In this manner the bearing strain of the springs is transferred to each of the adjacent and following springs. The springs 12, 12 are disposed substantially as shown in Fig. 1 of the drawings, and are held in such position by a tire 18.

The tire 18 is preferably square in cross section, as shown in Fig. 2 of the drawings. It is preferably constructed from rubber. Other resilient material might be substituted for the rubber without altering the construction or function of the said tire. The tire rests snugly between the side walls of the rim 8 and is guided thereby. Each section of the tire 18 slides within the channel of the rim 8 when and as receiving the load carried on the wheel A. The tire 18 is joined to form a circular band sufficiently constricted to exert a slight pressure upon all of the springs 12, 12 when the wheel is not rotated.

The tire 18 is provided with a square groove 19 arranged to receive within the channel thereof the rollers 15, 15 without bearing upon the said rollers. By this means is avoided binding the rollers when the same rest against the adjacent spring 12. The outer periphery of the tire 18 is grooved concentrically with a round wearing shoe 20, as shown particularly in Fig. 2 of the drawings.

It is to prevent the admission of grit or other foreign matter between the tire 18 and the side of the rim 8 that I have provided the flexible covering 21. The covering 21 may be constructed of any suitable flexible material, such as resilient rubber, canvas, leather or other similar material. The covering 21 is passed completely over and around the tire 18, fitting within a groove 22 formed in the outer periphery thereof.

The covering 21 is maintained in position upon the rim 8 and tire 18 by means of structural clamping plates 23, 23. The plates 23, 23 are sufficiently wide to encompass the felly of the wheel A and the rim 8, being secured to both the said felly and said rim by bolts 24, 24. The plates 23, 23 are preferably constructed of light steel. The said plates further serve to hold the covering 21, as shown in Fig. 2.

It will be noticed that the springs 12, 12 are disposed so that the free ends extend to the rear of their pivotal mountings in the driving wheels for the vehicle. This arrangement is peculiarly advantageous, as the friction exerted by the tire 18 upon the springs serves to increase the grip thereof, by reason of the bending or bowing outward of the spring between the point of frictional engagement with the said tire and the pivotal connection of the said spring. Further, by reason of the increased dimension of the spring produced by the above mentioned crowding, the tire is hardened at the moment of gripping the road, thereby avoiding the speed loss usual to yielding tire constructions.

Having thus described my invention, what I claim as new and desire to secure by Letters Patent is:—

1. A spring tire, comprising an outwardly channeled rigid rim fixedly mounted on a vehicle wheel; a plurality of short leaf bowed springs pivotally mounted upon said rim and disposed in lapped relation, each spring lapping the following adjacent spring; a plurality of rollers pivotally mounted upon the free end of each of said springs to bear upon the adjacent spring; and a tire constructed of resilient material and having formed on the inner periphery thereof a groove adapted to receive the said rollers loosely therein.

2. A spring tire, comprising an outwardly channeled rigid rim fixedly mounted on a vehicle wheel; a plurality of short leaf bowed springs pivotally mounted upon said rim and disposed in lapped relation, each spring lapping the following adjacent spring; a plurality of rollers pivotally mounted upon the free end of each of said springs to bear upon the adjacent spring; a tire constructed of resilient material and having formed on the inner periphery thereof a groove adapted to receive the said rollers loosely therein, and said tire having a groove formed in the outer periphery thereof to receive a wearing shoe; a flexible cover encompassing said tire and said rim; and a flexible wearing shoe to fit within the said groove and over the said cover.

In testimony whereof I have signed this specification in the presence of two subscribing witnesses.

VERNON A. MARSH.

Witnesses:
EDWIN H. MUNTZ, Jr.,
B. W. MARTIN.